US012778352B2

(12) United States Patent
Pallua et al.

(10) Patent No.: US 12,778,352 B2
(45) Date of Patent: Nov. 3, 2026

(54) APPARATUS AND METHOD FOR AUTOMATED FOOD PREPARATION

(71) Applicant: Circus Robotics GmbH, Hamberg (DE)

(72) Inventors: Emanuel Pallua, Berlin (DE); Julian Stoß, Berlin (DE); Marco Pupillo, Munich (DE); Jakob Berghofer, Munich (DE); Paul Stiepel, Augsburg (DE); Dimitri Dell, Augsburg (DE); Johannes Scharrer, Augsburg (DE)

(73) Assignee: CIRCUS ROBOTICS GMBH, Hamburg (DE)

( * ) Notice: Subject to any disclaimer, the term of this patent is extended or adjusted under 35 U.S.C. 154(b) by 835 days.

(21) Appl. No.: 18/018,993

(22) PCT Filed: Jul. 30, 2021

(86) PCT No.: PCT/DE2021/000130
§ 371 (c)(1),
(2) Date: Jan. 31, 2023

(87) PCT Pub. No.: WO2022/022764
PCT Pub. Date: Feb. 3, 2022

(65) Prior Publication Data

US 2023/0284838 A1 Sep. 14, 2023

(30) Foreign Application Priority Data

Jul. 31, 2020 (DE) ..................... 20 2020 003 300.6
Feb. 5, 2021 (DE) ..................... 20 2021 000 446.7

(51) Int. Cl.
*A47J 44/00* (2006.01)
*A47J 43/046* (2006.01)

(52) U.S. Cl.
CPC ............ *A47J 44/00* (2013.01); *A47J 43/046* (2013.01)

(58) Field of Classification Search
CPC .. G07F 17/0064; G07F 17/0078; G07F 13/10; A47J 43/00; A47J 43/04;
(Continued)

(56) References Cited

U.S. PATENT DOCUMENTS 4,748,902 A 6/1988 Maurantonio
5,064,093 A 11/1991 Davis et al.
(Continued)

FOREIGN PATENT DOCUMENTS

AU 6579186 A 6/1987
CN 205454135 U * 8/2016
(Continued)

OTHER PUBLICATIONS

International Search Report and Written Opinion dated Jan. 24, 2022 for PCT/DE2021/000130.
(Continued)

*Primary Examiner* — Hung D Nguyen
(74) *Attorney, Agent, or Firm* — Harness, Dickey & Pierce, P.L.C.

(57) ABSTRACT

The invention relates to an apparatus for automated food preparation comprising at least one preparation vessel which is substantially rotationally symmetrical about an axis of rotation and is adapted to receive at least one foodstuff, and at least one mixing device which is adapted to mix the contents of the preparation vessel, wherein the preparation vessel comprises a coupling element extending substantially along the axis of rotation, the coupling element being adapted to cooperate with a complementary coupling element of the mixing means so that the preparation vessel is received in the mixing means and can be caused to rotate
(Continued)

about the axis of rotation of the preparation vessel, and an associated method.

21 Claims, 12 Drawing Sheets

(58) Field of Classification Search
CPC .... A47J 43/044; A47J 43/046; A47J 43/0705; A47J 43/0716; A47J 43/0766; A47J 43/08; A47J 43/085; A47J 44/00; A47J 44/02
See application file for complete search history.

(56) References Cited

U.S. PATENT DOCUMENTS

| | | | | |
|---|---|---|---|---|
| 6,817,750 | B1 | 11/2004 | Sands | |
| 2005/0193901 | A1 * | 9/2005 | Buehler | A23L 5/10 99/468 |
| 2009/0099691 | A1 | 4/2009 | Tojo et al. | |
| 2015/0114236 | A1 | 4/2015 | Roy et al. | |
| 2016/0128503 | A1 | 5/2016 | Xu et al. | |
| 2017/0172350 | A1 * | 6/2017 | Farid | A47J 44/00 |
| 2018/0310773 | A1 | 11/2018 | Sekar et al. | |
| 2020/0037824 | A1 | 2/2020 | Moon et al. | |

FOREIGN PATENT DOCUMENTS

| | | | | |
|---|---|---|---|---|
| CN | 106923645 | B * | 9/2018 | A47J 27/00 |
| CN | 111179504 | A | 5/2020 | |
| EP | 2572614 | A1 | 3/2013 | |
| WO | 95/20903 | A1 | 8/1995 | |
| WO | 2015125017 | A2 | 8/2015 | |
| WO | 2017055832 | A1 | 4/2017 | |
| WO | 2018/133861 | A1 | 7/2018 | |
| WO | 2019/123472 | A1 | 6/2019 | |

OTHER PUBLICATIONS

Office Action for European Application No. 2517431.5 dated Nov. 25, 2025.
Search Report for European Application No. 25174340.7 dated Nov. 21, 2025.
Office Action for European Application No. 25170530.7 dated Dec. 1, 2025.
European Communication dated Jul. 22, 2026 for corresponding European Application No. 25170530.7.
European Office Action dated Jul. 30, 2026 for corresponding European Application No. 25174341.5.

* cited by examiner

APPARATUS AND METHOD FOR AUTOMATED FOOD PREPARATION

CROSS-REFERENCE TO RELATED APPLICATIONS

This is a 371 US national stage application of PCT/DE2021/000130, filed Jul. 30, 2021, and entitled "Apparatus and Method for Automated Food Preparation" which claims priority of German Utility Model Application No. 202020003300.6, filed Jul. 31, 2020 and German Utility Model Application No. 202021000446.7, filed Feb. 5, 2021.

BACKGROUND OF THE INVENTION

The invention relates to an apparatus and a method for automated preparation of food.

From the publication WO 2018/133861 A1 a system is known, which stores ingredients for meals, feeds them to a cooking process under computer control and then packs the cooked meal. A processor-controlled system is known from WO 2019/123472 A1, wherein dispensers for ingredients, a carousel conveyor, a stirring device, a heater and a display are connected to one another via the processor.

It is an object of the invention to provide an apparatus and a method capable of automatically preparing food in an improved manner. This object is achieved by an apparatus for automated food preparation including at least one preparation vessel and at least one mixing device, a method for automatically preparing food using the same, a dispenser module of the apparatus, a cooking module of the apparatus, a separating device of the apparatus, and a preparation vessel of the apparatus.

SUMMARY OF THE INVENTION

One aspect of the invention relates to an apparatus for automated preparation of food, the apparatus having at least one of the following features:

- at least one storage container, which is designed to store a food product;
- at least one dispensing device adapted to convey a food product from one of the storage containers;
- at least one preparation vessel designed to hold at least one food product;
- at least one mixing device designed to mix the contents of the preparation vessel;
- at least one heating device designed to heat the contents of the preparation vessel;
- at least one manipulator designed to handle the at least one preparation vessel;
- at least one transfer station in which the contents of the preparation vessel are transferred to a serving vessel;
- at least one manipulator, which is designed to handle at least one serving vessel;
- at least one dispensing station in which the serving vessel is dispensed from the apparatus;
- at least one temperature control device which keeps the interior of the device or parts thereof at a predetermined temperature, at least in certain areas;
- at least one hygiene device, which cleans the interior of the device or parts thereof, at least in certain areas;
- at least one control device that controls or regulates at least one of the components to perform the preparation;
- at least one communication device, which is designed to connect the control device with a user or a higher-level control system.

Advantageously, the need to prepare food in a quick and flexible manner, in particular at the user's request, can be fulfilled in a fresh and ready-to-eat manner. The apparatus is advantageously designed to be essentially compact, mobile and/or self-sufficient, so that the device can be easily moved to a location and set up without having to interfere with the surroundings or the surrounding building structure.

The apparatus can be at least partially enclosed or delimited by a wall. Preferably, the wall is completely closed or closable. The wall can separate the interior of the device from an external environment. Preferably, the separation can prevent a user from reaching into the interior of the apparatus from the external environment. Furthermore, the exchange of solids, dust, liquids, gases, aerosols and/or fluids between the interior and the environment can be prevented. Advantageously, this can prevent contamination or pollution of the interior of the apparatus by substances from the environment as well as, conversely, pollution of the environment by substances from the device. Further advantageously, the interior of the apparatus can be thermally decoupled by the wall. Thus, the temperature inside the apparatus and the temperature in the environment of the apparatus can be different from each other. Preferably, temperature inside the apparatus can be colder than the ambient temperature of the apparatus by more than about 5 degrees Celsius, preferably by more than about 10 degrees Celsius.

It is understood that for the operation of the apparatus, electricity and fresh water should be supplied and waste water discharged. Therefore, the wall of the apparatus is suitably provided with connections for electricity, fresh water and waste water. Alternatively or additionally, it is possible to store fresh water and waste water in tanks within the apparatus, or at least to store them temporarily, in order to enable at least temporary self-sufficient operation of the apparatus. Electrical energy can also alternatively or additionally be stored or generated within the apparatus, for example by accumulators, fuel cells, solar cells or a diesel-, gasoline- or gas-powered generator. Alternatively or additionally, the energy required for heating or cooling can also be generated by gas, in particular propane provided in a gas tank or at least one gas cylinder. Accordingly, at least one device for emitting exhaust gases can also be provided in the wall.

It is further understood that closable openings may be provided in the wall to allow temporary access to the interior of the apparatus. For example, at least one flap, at least one door, at least one drawer and/or at least one pull-out can be formed or arranged in the wall. These openings are preferably secured against unauthorized opening by means of corresponding interlocks, for example by means of screwed connections, rotary bolts, locks, etc. The interlocks can be unlocked in particular only by a special tool, a key or a biometric and/or electronic signal.

The wall can also be transparent in certain areas. In particular, a window can be provided through which a user can follow the preparation. Due to the preferred thermal decoupling, the window can preferably be designed with double or triple, in particular anti-reflective or coated or tinted, glazing. Further preferably, the transparent wall or window is designed to be impermeable to ultraviolet and/or infrared radiation (UV/IR radiation). Advantageously, this can reduce or prevent heating of the interior of the apparatus or other influence of solar radiation on the interior or the food located therein.

Furthermore, different light sources or displays can be provided inside the apparatus, which can indicate different states of the apparatus, such as the status of the preparation of a meal, which can realize different lighting moods/colors in different situations (time of day, seasons) or which can display information, in particular as a display (for example as a screen). For this purpose, a large-area display can be arranged in particular on the rear wall of the interior of the apparatus in such a way that a user has a complete view of this display.

The dimensions of the apparatus given by the wall are preferably such that the apparatus is smaller than a standard 20-foot container. In particular, the length of the apparatus is less than or equal to 6.095 m. In particular, the width of the apparatus is less than or equal to 2.352 m. In particular, the height of the apparatus is less than or equal to 2.393 m. Accordingly, the weight of the apparatus should be less than or equal to about 28 metric tons preferably less than 22 metric tons, so that the apparatus can advantageously be transported like a container in a simple manner. Particularly preferably, the apparatus is about 4 m long, about 2 m wide and about 2 m high wherein the weight is less than about 6 metric tons, in particular less than about 5 metric tons.

Preferably, the apparatus can be disassembled into modules for transport or installation at the place of operation, which do not exceed a width of about 1 m and/or a height of about 1.95 m. Preferably, the individual modules can be mechanically and/or electrically and/or fluidically interconnected by means of quick-release fasteners. In other words, such a quick fastener allows, in particular without tools, a reliable mechanical connection between the modules, for example by bringing a fastener element into connection with a complementary fastener element and optionally securely connecting them to each other, in particular releasably, by tensioning or locking. Optionally, at least one electrical connector may be provided on a module that electrically contacts an associated complementary electrical connector of another module when a mechanical connection is made between the modules. Advantageously, an electrical connection for power supply and/or transmission of electrical (control) signals can be made in a simple manner in this way. Optionally, at least one fluidic connector can be provided on a module that makes fluidic contact with an associated complementary fluidic connector of another module when a mechanical connection is made between the modules. Advantageously, fluidic connection for supply of a fluid and/or disposal of a fluid can be established in a simple manner. A fluid in the sense of the application is a liquid, a gas or a liquid-gas mixture.

The individual modules from which the apparatus can be assembled may be substantially cuboidal in shape, resulting in a substantially cuboidal device. However, the modules can also be in the form of cylinders, hexagonal prisms, octagonal prisms, cylinder segments or the like. Thus, apparatuses of various shapes can be formed in a modular manner.

The apparatus may comprise at least one storage container configured to store a foodstuff. The at least one foodstuff may be in liquid, solid, paste, powder, dry, ground, granular, granular or chunky form or mixtures thereof. The foodstuff may be stored in the storage container raw, pre-cooked, or ready to serve. The storage container may have a food-safe inner surface or be formed entirely of food-safe material. A filling level sensor may be arranged in or on the storage container, which provides data on the filling level of the storage container. The sensor may be, for example, a load cell, a level sensor, a fill level sensor, a pressure sensor, or the like. The storage container suitably has an outlet, and preferably an emptying aid may be provided which may be located in or on the storage container and which preferably helps to displace the contents of the storage container towards the outlet of the storage container. This can be done by vibrating or shaking or tilting the storage container or its contents, or by shifting the contents by means of a pushers, augers or other devices.

The apparatus may include at least one dispensing means adapted to convey a foodstuff from one of the storage containers. Each dispensing device is preferably uniquely associated with one of the storage containers. Accordingly, a dispensing device may be designed to convey a liquid, solid, pasty, dry, powdery, ground, granular, granular or chunky foodstuff or mixtures thereof. For this purpose, the at least one dispensing device may comprise a peristaltic pump or hose pump, a screw conveyor, a paddle wheel conveyor, a pneumatic conveyor, a suction conveyor, in particular for discontinuous and/or pneumatic conveying of powders and granules, a pneumatic overpressure conveyor, a vibration conveyor or other conveyors. The conveyors are designed such that the associated foodstuffs can be dispensed in a predetermined quantity. For example, the screw conveyor may be designed with respect to the screw diameter and pitch in such a way that a predetermined amount of a foodstuff is conveyed or dispensed into the preparation vessel per revolution of the screw. Multiples of this quantity can be dispensed or conveyed by presetting the number of revolutions of the screw to be rotated. A resolver, i.e. sensor, which detects the revolutions can be used to control or determine the quantity conveyed.

Similarly, a paddle wheel conveyor may be provided which may have two, three, four, five, six or more paddles. Accordingly, the amount of foodstuff to be conveyed can be determined by the number of revolutions of the paddle wheel, wherein fractions of a whole revolution are also possible, in particular half revolutions for paddle wheels with two, four, six, eight, ten or more paddle wheels, in particular third revolutions for paddle wheels with three, six, nine or more paddle wheels, in particular quarter revolutions for paddle wheels with four, eight or more paddle wheels, and so on.

Particularly preferably, a blade wheel is provided which blades have a first region and a second region, the first region being stiffer or more rigid than the second region. The stiffness or rigidity can be understood in terms of an elongation, a thrust, a bending and/or a torsion. The term "stiffness" is used in the linear elastic range of deformation, while the term "rigidity" is used in plastic deformation. The blades of the paddlewheel can be deformed both elastically and plastically during use. Preferably, the first region is proximal to the paddlewheel axis and the second region is distal relative to the first region. Preferably, the greater stiffness or rigidity of the first region may be formed by the first region having a greater thickness than the second region. Alternatively or additionally, the second region may include weak points or cavities. Alternatively or additionally, the second region may be formed of a material that is less rigid compared to the material used in the first region. Advantageously, the foodstuff to be conveyed can be conveyed particularly gently by this design of the paddle wheel. Furthermore, a good or tight connection of the paddle wheel to a wall in the dispensing device is possible.

Each dispensing device can have an associated drive by means of which a foodstuff can be conveyed out of the storage container associated with the dispensing device. The drive can be designed as an electric motor, preferably as a three-phase motor, the drive being fed in particular by a frequency converter. Particularly preferably, two or more drives of the dispensing devices, in particular all drives of the dispensing devices, can be electrically connected to a single frequency converter as required, depending on which of the dispensing devices is to be activated. This makes it advantageously possible to provide only one frequency converter, since preferably only one dispenser device needs to be operated at a time.

Preferably, the dispensing device and the associated drive are detachably connected to each other via a coupling. Particularly preferably, a toggle coupling or claw coupling can be provided. Advantageously, this allows the dispensing device and the drive to be separated by a linear displacement, in particular by a linear displacement along a displacement direction that is oriented essentially perpendicular to the axis of rotation of the coupling.

It is understood that dispensing means may be provided to displace foodstuff from the storage containers with or against gravity, depending on whether the associated storage container is located above or below the outlet of the dispensing means. Below the outlet of the dispenser device, a collecting device may be arranged which is designed to collect residues or drops of the food products which fall or drip out of the dispenser device in an uncontrolled manner. Preferably, the collecting device can have a drain through which the collected residues can be flushed away.

Preferably, at least one storage container and the associated dispenser(s) may be combined into a dispenser module with or without the associated drive(s). If the drives are not part of the dispenser module, a coupling may be provided between the drives and dispenser module. As described above, a toggle coupling or claw coupling can preferably be provided. Advantageously, this allows the dispenser device and the drive to be separated by a linear displacement, in particular by a linear displacement along a displacement direction oriented substantially perpendicular to the axis of rotation of the coupling. Since several dispensing devices are arranged next to each other in the dispenser module due to the combination, the coupling parts of the dispensing devices are preferably arranged in such a way that the toggles or the claws are aligned with each other. Then, further advantageously, in a linear displacement substantially perpendicular to the axis of rotation, the toggle or claw of a dispensing device can be disengaged from the claw or toggle of the associated drive and displaced through or past the claw or toggle of at least one non-associated drive. Advantageously, this allows a dispenser module to be separated from the associated drives by linear displacement and replaced with a freshly filled dispenser module. Alternatively, the dispenser module may also include the associated drives, so that advantageously only one electrical connection between the device and the dispenser module needs to be disconnected and reconnected between the device and the freshly filled dispenser module. However, this advantage implies a heavier dispenser module, since the drives must be included and thus exchanged as well in order to refill the device with fresh foodstuff.

The apparatus can have at least one preparation vessel which is designed to hold at least one foodstuff. The at least one foodstuff may be conveyed into the preparation vessel by means of the at least one dispensing device. Such a preparation vessel is described below.

One aspect of the invention relates to a preparation vessel adapted to be used with an apparatus according to the invention. The preparation vessel is preferably formed of a heat resistant, easy to clean and food safe material. For example, the preparation vessel may be formed of a non-corrosive metal or stainless steel. Alternatively or additionally, the interior of the preparation vessel can be coated, for example with a polymer, preferably a PTFE—also known as Teflon.

Preferably, the preparation vessel is conical or funnel-shaped. The area of the preparation vessel with the larger diameter can be designed or intended to receive the food from the at least one dispensing device. Advantageously, the contents of the preparation vessel are concentrated in the region with the smaller diameter. Preferably, the preparation vessel is formed substantially rotationally symmetrical about an axis of rotation, wherein the ingredients are fillable along a direction oriented parallel to the axis of rotation. The cone-shaped wall of the preparation vessel may include an angle $\alpha$ with the axis of rotation, which is preferably about 30 degrees to about 60 degrees. Preferably, the inner wall has exactly one, two or more rib(s) or fin(s) or scoop channel(s) which, in particular in certain areas, extend(s) radially inwardly. By rotating the preparation vessel about the axis of rotation, the contents of the preparation vessel can be thoroughly mixed by means of the rib(s).

Preferably, the preparation vessel can have a coding or marking that indicates a purpose of use. For example, a preparation vessel that is only used for vegan dishes or allergen-free dishes can have a special color or surface design. Advantageously, this can be used to indicate to a user that no contamination with allergens from other dishes can occur through the preparation of other dishes with this preparation vessel.

The apparatus may comprise at least one mixing device adapted to mix the contents of the preparation vessel. In other words, the at least one foodstuff in the preparation vessel is agitated, shaken and/or mixed by forcing or rotation such that a substantially homogeneous mass or mixture may be formed.

The mixing device can preferably be designed to set the preparation vessel in rotation, which results in thorough mixing, in particular in cooperation with a rib or fin or scoop arranged on the inner wall of the preparation vessel. Particularly preferably, the axis of rotation of the preparation vessel coupled to the mixing device is different from the vertical. Preferably, the axis of rotation can make an angle $\beta$ with the vertical of about 30 degrees to about 60 degrees, in particular about 45 degrees. Preferably, the sum of the angles $\alpha$ and $\beta$ is approximately 90 degrees. In other words, a portion of the cone-shaped wall of the preparation vessel is oriented substantially horizontally when the preparation vessel is received in the mixing device.

The mixing device can alternatively or additionally have a mixing mechanism or agitator which can be displaced at least in some areas into the interior of the preparation vessel. The agitator can have an agitating whisk, an agitating screw, agitating pusher or the like, which is at least partially immersed in the foodstuff introduced into the preparation vessel and sets them in rotation by mechanical force and thereby mixes it. It is understood that the agitator or mixing device, in particular in the area which can come into contact with the at least one foodstuff, are made of a food-safe material, for example corrosion-free steel or stainless steel.

Preferably, a vapor extractor can be arranged relative to the mixing device in such a way that the opening of the preparation vessel is oriented in the direction of the vapor extractor during mixing. In particular, the vapor and other fumes can be exhausted downwardly and, in particular, directed to the cooling device to be cooled or dehumidified. One side of the vapor extractor may be oriented toward a window in the wall of the device, such that a user can see through this window to this side of the vapor extractor.

Therefore, preferably, a display may be arranged on this side of the vapor extractor which may, for example, display information about the dish and/or the preparation progress.

The apparatus can have at least one heating device which is designed to heat the contents of the preparation vessel. In particular, the heating device can heat the preparation vessel by means of induction. The induction coils may be wound in a substantially circular or elongated manner. In particular, the induction coil geometry may be designed to match the wall shape of the preparation vessel. Heating of the preparation vessel may also be accomplished by a conventional electrically powered heating plate or by a gas flame. The heating device may be oriented substantially horizontally. In particular, the heating device is arranged such that it is located at a small distance of about 1 mm to about 10 mm from the preparation vessel when the preparation vessel is received in the mixing device. Preferably, the heating device is concave in regions such that it has approximately the same radius of curvature along a direction in this region as a region of the wall of the preparation vessel. Advantageously, this can improve the heat input into the preparation vessel.

Preferably, at least one sensor can be provided which measures a condition of the preparation vessel or the contents. A preferred sensor is a temperature sensor which detects the temperature of the preparation vessel. A further preferred sensor is a temperature sensor which detects the temperature of the contents of the preparation vessel, wherein this sensor expediently enables non-contact temperature measurement. Furthermore, a sensor, in particular a camera, may be provided to optically detect the contents of the preparation vessel. Furthermore, a sensor, in particular a microphone, may be provided to acoustically detect the contents of the preparation vessel. The measured values of the at least one sensor can be transmitted to a heating controller that is communicatively connected to the at least one sensor. The heating control can be designed to control or regulate exactly one heating device or several heating devices. In particular, the heating control can comprise a memory in which at least one heating curve is stored in order to control or regulate the heating device as a function of at least one of the following values: a) the temperature of the preparation vessel, b) the temperature of the contents of the preparation vessel, c) the detected optical properties of the contents of the preparation vessel, d) the detected acoustic properties of the contents of the preparation vessel. Particularly preferably, an associated heating curve can be stored in the memory of the heating device for each dish.

The heating device can preferably be designed as part of a cooking module. Each cooking module can comprise at least one element from the following: a mixing device for receiving and mixing the contents of the preparation vessel, a heating device, an associated heating control, at least one sensor, a vapor extractor and a display. In this regard, the mixing device and/or the heating device may include means for receiving the preparation vessel. It is understood that the cooking module may constitute a separate aspect of an invention detached from the further features of the apparatus, since a cooking module is advantageously also of interest for other cooking applications outside the apparatus, in particular since cooking by means of the individual heating curves promotes a success of the dish.

The device can have at least one (first) manipulator which is designed to handle the at least one preparation vessel. It is understood that two, three or more first manipulators may also be provided, which are preferably identically designed to handle one associated preparation vessel each. The first manipulator may be a robot, in particular an articulated arm robot, SCARA robot or delta robot. The articulated arm robot may preferably have five, six or seven axes. The at least one manipulator may be mounted to a floor or ceiling of the interior of the apparatus. The manipulator may have an end effector mounted on the distal end member, wherein the end effector is configured to grip the preparation vessel on a handling member. For this purpose, the end effector may enter into frictional engagement and/or positive engagement with the handling element and, in particular, the end effector may be locked to the handling element. In particular, the manipulator can be designed to be disinfectable or food-safe. Particularly preferably, the manipulator is formed of a corrosion-free metal or a chemically inert material, for example, stainless steel or a chemically resistant plastic. Particularly, the manipulator is designed in such a way that no impurities such as oil droplets, dust or metal debris are released into the environment. In particular, a negative pressure may be applied or generated inside the manipulator to suck such contaminants into the interior of the manipulator. Advantageously, this prevents such contaminants from entering the interior of the device and contaminating the food products there. For example, a fan can be arranged in the proximal end member of the manipulator, whereby an air flow is generated which leads from the environment of the manipulator through the gaps of the manipulator into the interior of the manipulator, and from there, preferably via a filter element, is led out of the manipulator away from the working area of the manipulator. Advantageously, the air passing through the manipulator can be purified by the filter element. Furthermore, the manipulator may be controlled such that no component of the manipulator is located above the preparation vessel during preparation of a meal. This measure can minimize the risk of contaminants such as oil droplets, dust or metal debris falling from the manipulator into the dish.

As an alternative to a corrosion-free or chemically inert manipulator surface, the manipulator can be covered with an easy-to-clean sleeve. The cover also advantageously ensures that contaminants do not pass from the manipulator onto the dishes. Preferably, the sleeve may be formed of a polymer, in particular an elastomer. Preferably, the sleeve is designed to be resistant to cleaning agents and disinfectants, such as alcohols, alkalis or surfactants.

The first manipulator can have a weighing device which is designed to determine or measure the force acting on the end effector, in particular the vertically acting weight force. This allows the weight of the foodstuffs filled into the preparation vessel to be measured independently of a measurement at the dispensing devices.

The apparatus may include at least one transfer station in which the contents of the preparation vessel are transferred to a serving vessel. The transfer station may have a substantially flat surface onto which the serving vessel is provided. The transfer station is arranged at least in part in the working area of the first manipulator. Transferring the food products from the preparation vessel to the serving vessel may be performed by tilting the preparation vessel by means of the manipulator, whereby the prepared food products are transferred to the serving vessel. To achieve the most complete transfer possible, the preparation vessel may be rotated about its axis of rotation during the transfer. Preferably, the substantially flat surface of the transfer station may be formed such that it is easy to clean. For example, the surface may be formed of non-corrosive steel or stainless steel or a plastic. Particularly preferably, the transfer station comprises a drain which is designed to drain off a cleaning fluid with which the transfer station is cleaned.

Alternatively, the transfer can be made directly from the first to the second manipulator. In other words, the second manipulator can provide and/or hold (preferably in the air) the serving vessel, while the first manipulator tips or fills the contents of the preparation vessel into the serving vessel. In this case, the common working space of the two manipulators and, if applicable, the surface underneath it may be referred to as the transfer station, especially in the case where the serving vessel is not placed on the surface.

The apparatus may comprise at least one (second) manipulator configured to handle the at least one serving vessel. The second manipulator can be a robot, in particular an articulated arm robot, SCARA robot or delta robot. The articulated arm robot may preferably have five, six, or seven axes. The at least one second manipulator may be mounted to a floor or ceiling of the interior of the device. The second manipulator may have an end effector mounted to the distal end member, the end effector configured to grip the serving vessel at a handling region. For this purpose, the end effector may frictionally engage and/or positively engage the handling region and, in particular, the end effector may be interlocked with the handling region. In particular, the manipulator can be designed to be disinfectable or food-safe. Particularly preferably, the second manipulator is formed of a corrosion-free metal or a chemically inert material, for example, stainless steel or a chemically resistant plastic. Particularly, the second manipulator is designed in such a way that no contaminants such as oil droplets, dust or metal debris are released into the environment. In particular, a negative pressure may be applied or generated inside the second manipulator to suck such contaminants into the interior of the manipulator. Advantageously, this prevents such contaminants from entering the interior of the device and contaminating the food products there. For example, a fan may be arranged in the proximal end member of the second manipulator, whereby an air flow is generated which leads from the environment of the second manipulator through the gaps of the second manipulator into the interior of the second manipulator, and from there, preferably via a filter element, is led out of the second manipulator away from the working area of the second manipulator. Advantageously, the air passing through the second manipulator can be purified by the filter element.

As an alternative to a corrosion-free or chemically inert manipulator surface, the second manipulator can be covered with an easy-to-clean sleeve. The cover also advantageously ensures that contaminants do not pass from the second manipulator onto the dishes. Preferably, the sleeve can be formed from a polymer, in particular an elastomer. Preferably, the sleeve is resistant to cleaning agents and disinfectants, such as alcohols, alkalis or surfactants.

Particularly preferably, the apparatus comprises a first and a second manipulator, wherein the first manipulator is adapted to handle the preparation vessel and the second manipulator is adapted to handle the serving vessel. Accordingly, the transfer station is arranged at least regionally both in the working space of the first manipulator and in the working space of the second manipulator. Preferably, only one manipulator can be provided, which is designed to take over the tasks of the first and second manipulator and to handle both the preparation vessel and the serving vessel.

The handling or provision of the serving vessel by the second manipulator can in particular also include a separation of the serving vessel from a stack of serving vessels. For this purpose, the second manipulator may remove a serving vessel from a separating device. The separating device may in particular be designed to hold a stack of serving vessels, in particular above a dispensing opening, wherein preferably the lowermost serving vessel may be separated or detached from the stack to fall downwardly through the dispensing opening by means of gravity. For this purpose, the separating device may comprise at least one driven wedge-shaped actuator which grips the lowermost serving vessel at an edge and displaces it downwards until it is released from the stack. Preferably, the singulation device has two, three or more actuators. In particular, the actuators may be configured to laterally support and/or hold the stack of serving vessels, in particular by clamping the stack between the actuators. In a particularly preferred embodiment of the separating device, the at least one actuator is formed as a substantially cylindrical body having formed on its peripheral surface a screw channel or thread in which the rim of the serving vessel can engage so that the rim can be guided or displaced by the helical flight or thread as the actuator rotates. In particular, the screw channel or thread may be configured such that the pitch of the channel becomes progressively higher from top to bottom. In other words, rotation of the actuator in the upper part, where the serving vessel is still connected to the stack, in particular by static friction, causes less vertical displacement than in the lower part, where the serving vessel is already detached from the stack. In other words, with uniform rotation of the actuator, the displacement speed increases from top to bottom, while the force transmitted to the edge of the serving vessel decreases from top to bottom. This is advantageous because when the serving vessel is separated along gravity, the force to be applied decreases from the top (to overcome static friction) to the bottom (after release). For synchronous turning or rotating of two or more actuators, a (toothed) belt, chain or sprocket can be provided, which connects the actuators to each other mechanically and optionally to a drive. The drive can also be provided by the second manipulator, provided that one of the actuators or a drive enables coupling with the second manipulator, in particular with an end effector of the second manipulator. It is understood that the orientation of the screw flight, and thus the action, may be reversed, provided that separation against gravity is to be achieved. It will further be understood that the singulation device may constitute a separate aspect of an invention detached from the other features of the device, since advantageous singulation of serving vessels or other vessels is also of interest for other applications.

The apparatus may include at least one dispensing station in which the serving vessel is dispensed from the apparatus. The dispensing station may have the at least one dispensing compartment comprising an associated closable opening in the wall of the device. The opening may be closable by a flap forming part of the wall of the device. The flap may preferably be at least partially transparent, for example formed of glass or transparent plastic, to provide a view of the food provided in the dispensing station or compartment.

Preferably, each output compartment may be formed as a lock, wherein the output compartment is separated from the interior of the apparatus by a second wall when the lockable opening or flap is opened to allow access to the output compartment. Advantageously, this can both prevent a user from accessing the interior of the apparatus and prevent air exchange that can cause heating and/or contamination of the interior air. Preferably, each of the serving compartments includes a rotatable bottom plate on which the serving vessel can be placed to provide it to a user for pickup. Rotation of the bottom plate, which may be effected by pulling on the flap associated with the bottom plate, displaces the prepared food from the device to facilitate access by a user. Further preferably, air outlet nozzles may be disposed on the side of the dispensing tray facing the interior of the apparatus from which warm air exits to form an air curtain that provides thermal decoupling of the dispensing tray from the interior of the apparatus.

The dispensing station can preferably have one, two, three, four, five, six, eight, ten, twelve or more dispensing compartments. In this regard, each of the dispensing compartments may be identified by a unique identifier on the outside of the wall or flap. Preferably, the unique identification may be a (sequential) number, an alpha-numeric character, a symbol, or a QR code. Further preferably, the unique identification can be variably formed, in particular by a display or a display that can show a current unique identification. Advantageously, the flap to be opened by the user for a particular food is identified.

Each of the serving compartments may be equipped with a heating device for keeping the finished prepared dish warm to maintain the dish at a comfortable eating temperature until the user removes the food from the serving compartment.

Preferably, the serving vessel can be moved to a post-processing area of the apparatus by means of the second manipulator after being picked up in the transfer station and before being set down in the dispensing station. In the post-processing area, the prepared food contained in the serving vessel can be further refined. Preferably, the post-processing area can have further storage containers and further associated dispensing devices in order to arrange further components of the dish, in particular sauces, dressings, toppings, garnishes, ketchup, mayonnaise, herbs, spices, fruit, vegetables, pieces of meat, grated cheese, seasoning mixtures, almond slivers, cream hoods, horseradish hoods, wasabi hoods or the like on the prepared food. In particular, there is no mixing of these other components of the dish with the contents of the serving vessel. A decorating or garnishing can thereby take place by means of a movement of the second manipulator relative to the dispensing device. Particularly preferably, a decoration in the form of patterns or at least one character or letter can be effected by means of a corresponding movement of the second manipulator. Further preferably, templates may be provided to apply a figure or image to the dish by applying the decoration.

The apparatus can have at least one temperature control device which keeps the interior of the apparatus or parts thereof at a predetermined temperature, at least in certain areas. For the purposes of the invention, tempering is understood to mean both cooling to a temperature below the ambient temperature of the device and heating to a temperature above the ambient temperature of the apparatus. Preferably, a cooling device is provided which keeps the storage containers or the contents of the storage containers constant at a temperature between about +2° C. to +8° C., preferably between about +2° C. and about +7° C., in particular between about +3° C. and +5° C. Advantageously, the foodstuffs stored in the storage container can thus be kept fresh for a period of at least 12 hours, preferably of at least 18 hours, in particular of at least 24 hours. Preferably, the tempering device may comprise a dehumidifying device which is adapted to dehumidify air. Advantageously, this reduces the risk of condensation within the apparatus.

In order to ensure the best possible shelf life of the foodstuffs stored in the device, it is advisable to cool essentially the entire interior of the apparatus to a temperature of less than about +10° C. This does not normally apply to the heating device and the preparation vessel attached to the heating device, in which the foodstuffs are prepared into a dish. As a rule, only the heating device and the preparation vessel arranged on the heating device, in which the foodstuffs are prepared into a dish, are excluded from this. Furthermore, the dispensing compartments of the dispensing station are excluded from this, since the finished prepared dish is kept warm there. Cooling the remaining areas of the apparatus makes it easy to comply with the strict hygienic standards for food preparation.

The cooling of areas of the apparatus can preferably be achieved by providing cooled air. For this purpose, the apparatus can be provided with connections for warm exhaust air and cool supply air. An external cooling unit can be connected to these connections, which cools the warm exhaust air from the device and supplies it to the connection for cool supply air. The cooling unit can be designed externally and not be part of the apparatus or designed as part of the apparatus. Preferably, a closed air circuit is provided in the interior of the apparatus, which provides for treatment/filtering of the air, which is then distributed, in particular cooled, back into the interior of the apparatus. Advantageously, an exhaust air opening in the wall can thus be avoided. The omission of an exhaust air opening or an exhaust air stack also offers the advantage that no exhaust air-related odor nuisance occurs in the vicinity of the apparatus and also no structural measures have to be taken to discharge the exhaust air. Particularly preferably, the air is cooled by a heat exchanger. Further preferably, the air is also dehumidified, in particular since the vapor generated during heating of the preparation vessel could otherwise condense on the inner walls of the apparatus, which must be prevented. Particularly preferably, the waste heat generated at the heat exchanger can be used to heat other areas of the apparatus. In particular, this waste heat can be used to supply heat to one of the heating devices provided.

The apparatus may comprise at least one heating device as a preferred embodiment of a temperature control device. In particular, the apparatus may comprise an induction heater adapted to heat the preparation vessel for preparing the food. Heating of the preparation vessel may also be accomplished by a conventional electrically powered hot plate or by a gas flame. Furthermore, a heating device may be provided to heat the dispensing compartments of the dispensing station to keep the finished dishes provided therein warm. Furthermore, a heating device can be provided which heats fresh drinking water or tap water.

The apparatus can have at least one hygiene device, which cleans the interior of the apparatus or parts thereof at least in some areas. Preferably, the at least one hygiene device can be designed as a rinsing device, which is designed to clean the at least one preparation vessel after use. For this purpose, rinsing of the preparation vessel with cold and/or hot water can be provided. In particular, the water can be sprayed into the preparation vessel at a pressure of more than 1 bar, preferably more than 1.5 bar, preferably more than 2 bar, in particular more than 3 bar, in order to remove the food residues present there. The water may exit through one or more spray nozzles to achieve the appropriate pressure. The at least one spray nozzle may be rotatably or stationarily arranged in the associated hygiene device. In this case, mobility of the at least one spray nozzle can expediently lead to a reduction in the necessary number of spray nozzles. A stationary arrangement of the spray nozzles, on the other hand, leads to a simpler design.

The warm rinsing water can be heated in particular by the waste heat generated in the heat exchanger of the cooling unit. Furthermore, the water can be provided with a rinsing agent, which in particular has fat-soluble properties, in order to improve the cleaning of the preparation vessel. Alternatively or additionally a cleaning brush can be provided, which cleans the preparation vessel mechanically. Particularly preferably, the preparation vessel can finally be dried with warm or hot air. Alternatively, the preparation vessel can be stored at a location provided for this purpose until it has dried, after which it can be used again.

Preferably, one of the at least one hygiene devices can be designed as a UV lamp, which is designed to irradiate a surface of the interior of the device in order to kill bacteria and/or viruses there. For example, such a surface or area may be the transfer station, the floor of the device, walls of the device, other surfaces of the device, or the like. Advantageously, the UV light can be used to permanently reduce germ contamination of the interior of the device without using cleaning agents and thereby disrupting the operation of the apparatus. It is convenient that transparent openings of the wall of the apparatus are formed by UV light blocking transparent materials.

Preferably, one of the hygiene devices can also be designed as an air treatment device, which uses UV light and/or plasma to remove harmful germs from the air flowing through the air treatment device. Advantageously, the plasma in particular destroys bacteria, viruses, fungi and prions and, if necessary, also toxic substances and other organic contaminants. Depending on the contact time of the air with the plasma, complete sterilization is advantageously also possible. Particularly preferably, a plasma is generated in the air treatment device by a piezoelectric direct discharge (PDD). Advantageously, this type of disinfection eliminates the need for complex vacuum systems or toxic chemicals, which means that the device has a lower risk of contaminating the food with these chemicals. Furthermore, atmospheric pressure plasmas of PDD discharge are cold, making plasma disinfection in the air treatment device very gentle and energy-saving compared to the usual disinfection methods using hot air, hot water steam or toxic substances, since additional cooling of the hot air is not required. Advantageously, the disinfection of the air can be done with atmospheric cold plasma in the cooling device, which is used to cool the air inside the apparatus. Another advantage is that the use of plasma for air treatment eliminates odors, so that the typical kitchen odor inside the apparatus is neutralized and, therefore, odor nuisance to the surroundings of the apparatus is avoided even in the case that air exchange would occur between the inside of the apparatus and the surroundings.

The apparatus may include at least one control device that controls or regulates at least one of the components to perform the preparation. For example, the control device may control the movements of one or both of the manipulators, in which case the control device is also referred to as a manipulator control device. Other equipment may also be controlled or regulated by an associated equipment controller. It is understood that a plurality of individual (fixture and/or manipulator) controls for the individual fixtures may also be referred to as a control in their entirety. The task of the (set-up and/or manipulator) controls is to control or regulate the devices based on specific control commands/signals. Therefore, these controls may also have specific hardware and/or software that is dependent on the equipment. Furthermore, one or more of these (device and/or manipulator) controls may also perform safety functions. Alternatively or additionally, a safety controller may also be provided which takes over the safety functions. A safety function is understood to mean, in particular, that when the wall of the device is opened or when a person enters the device, one or more devices, in particular the manipulators, are stopped or put into a safe state in which the person is not endangered by the corresponding device. A safety function can also be the monitoring of the operating parameters of one of the devices of the apparatus, for example, rotational speeds, temperatures and other parameters.

The apparatus can have at least one communication device, which is designed to connect the control device communicatively with a user or a higher-level controller. The higher-level control may be located outside the apparatus, for example, in a data center or implemented by means of a (virtual and/or decentralized) server. For example, the ordering process of a user, the recipe selection and the selection of the instructions necessary for the preparation of the recipe can be performed by the higher-level control.

A higher-level controller can, for example, be communicatively connected to a plurality of apparatuses and, in particular, send orders for the preparation of food to a selected apparatus. The selection can be made, for example, on the basis of the distance to the user ordering the dish.

Furthermore, the higher-level controller can monitor the plurality of apparatuses, for example, the function, technical faults or the stock of foodstuff. Furthermore, the higher-level control system can transmit the rules for preparing the food or the recipes to the individual apparatuses as required and thus supplement or vary the range of food. Each individual apparatus can have a memory device, in particular a non-volatile memory, in which these recipes are stored locally, so that the recipe does not have to be received by the higher-level controller via the communication device each time it is executed. The communication device can also establish a connection to a cloud so that the information relevant to the apparatus can be stored there. Advantageously, an update can thus be carried out in a simple manner. In this case, too, a memory can be provided for local buffering of this data.

Furthermore, data from the apparatus can be transmitted to the higher-level controller via the communication device, for example general status parameters, stock in the storage containers, system faults, log files, metrics and sensor data. This allows for monitoring of the apparatus or remote maintenance. It can also be used for active management of the foodstuff in the apparatus.

Another aspect of the invention relates to a method for automated food preparation, the method comprising at least one of the following method steps:

- receipt of an order to prepare a dish in the control device;
- selection of a recipe assigned to the dish by the control device;
- selection of a preparation vessel assigned to the dish by the control device;
- gripping of the selected preparation vessel by a first manipulator;
- positioning the preparation vessel by means of the first manipulator in accordance with the selected recipe successively at at least two dispensing devices, the dispensing devices filling the necessary foodstuffs into the preparation vessel in accordance with the recipe;
- positioning of the preparation vessel by means of the first manipulator on the mixing device or the heating device;
- mixing the contents of the preparation vessel by means of the mixing device and/or heating the contents of the preparation vessel by means of the heating device according to the selected recipe;
- transferring the preparation vessel by means of the first manipulator to a transfer station;
- providing a serving vessel, preferably by separating it from a stack of serving vessels;

transferring the contents of the preparation vessel into the provided serving vessel, wherein during the providing and/or the transferring a second manipulator handles the serving vessel;

positioning the serving vessel by means of the second manipulator according to the recipe sequentially at at least one selected dispensing device so that the dispensing device according to the recipe can fill the necessary food, for example a topping, into the serving vessel;

removing the serving vessel to or into a dispensing station to be made available for dispensing to the user;

identifying the user and enabling the serving station in which the dish assigned to the user is located in the serving vessel;

clean the preparation vessel for further use.

BRIEF DESCRIPTION OF THE DRAWINGS

Preferred embodiments are shown in more detail in the figures. Identical elements are provided with the same reference signs in the figures. It in shown in.

DETAILED DESCRIPTION

Figure 1:
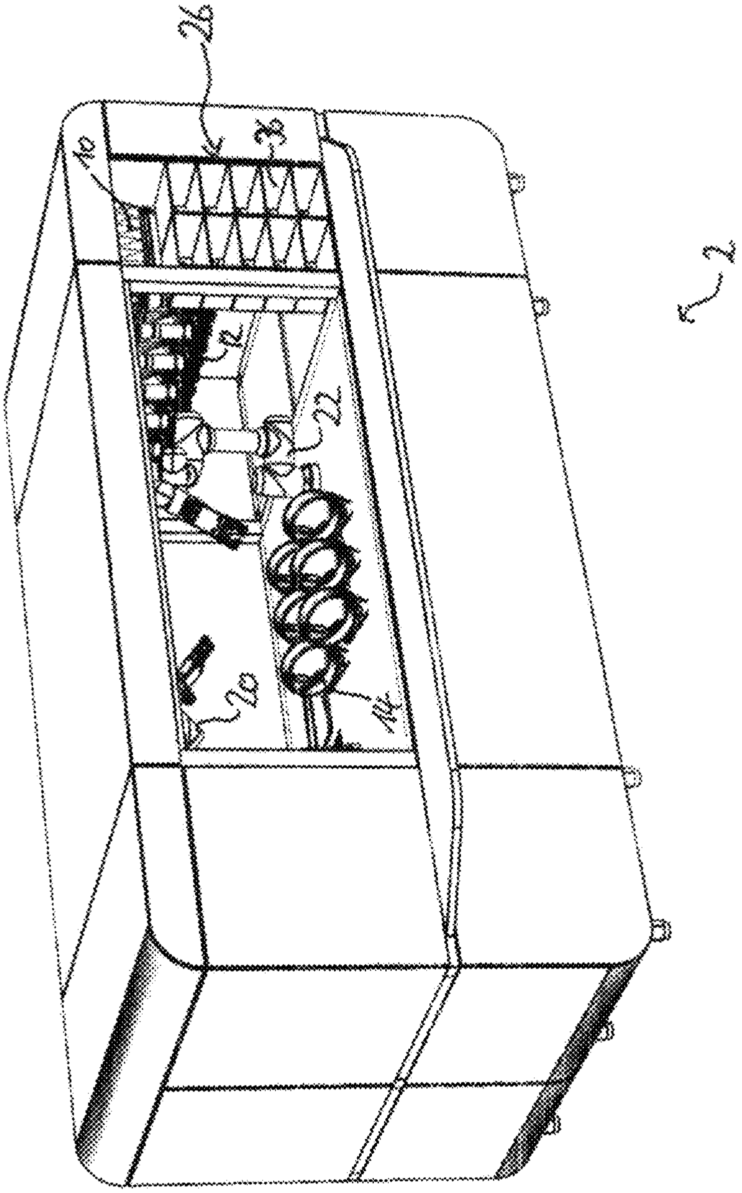
FIG. 1 a perspective view of an apparatus according to the invention for automated food preparation.
Figure 2:
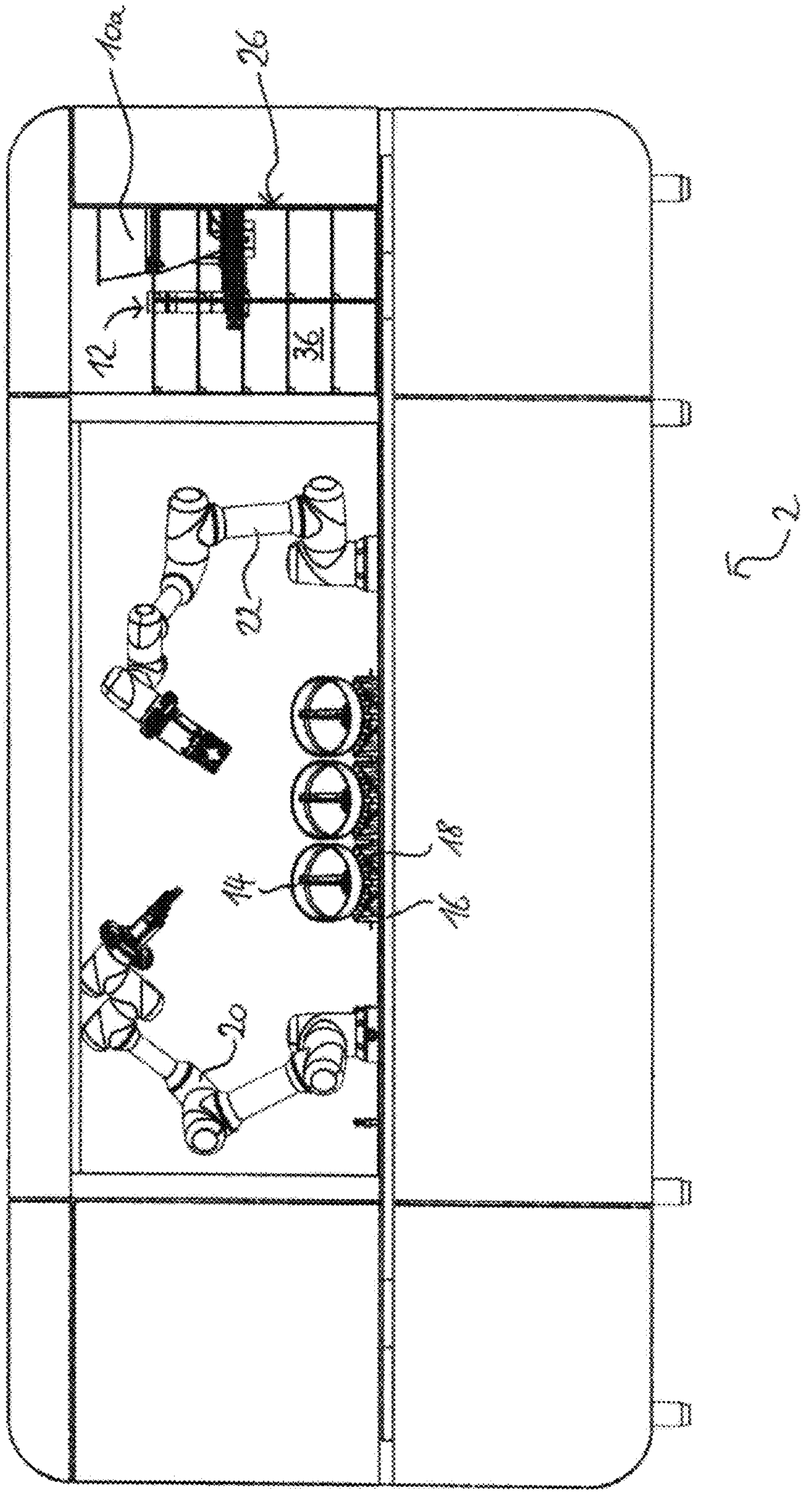
FIG. 2 a front view of the embodiment shown in FIG. 1.
Figure 3:
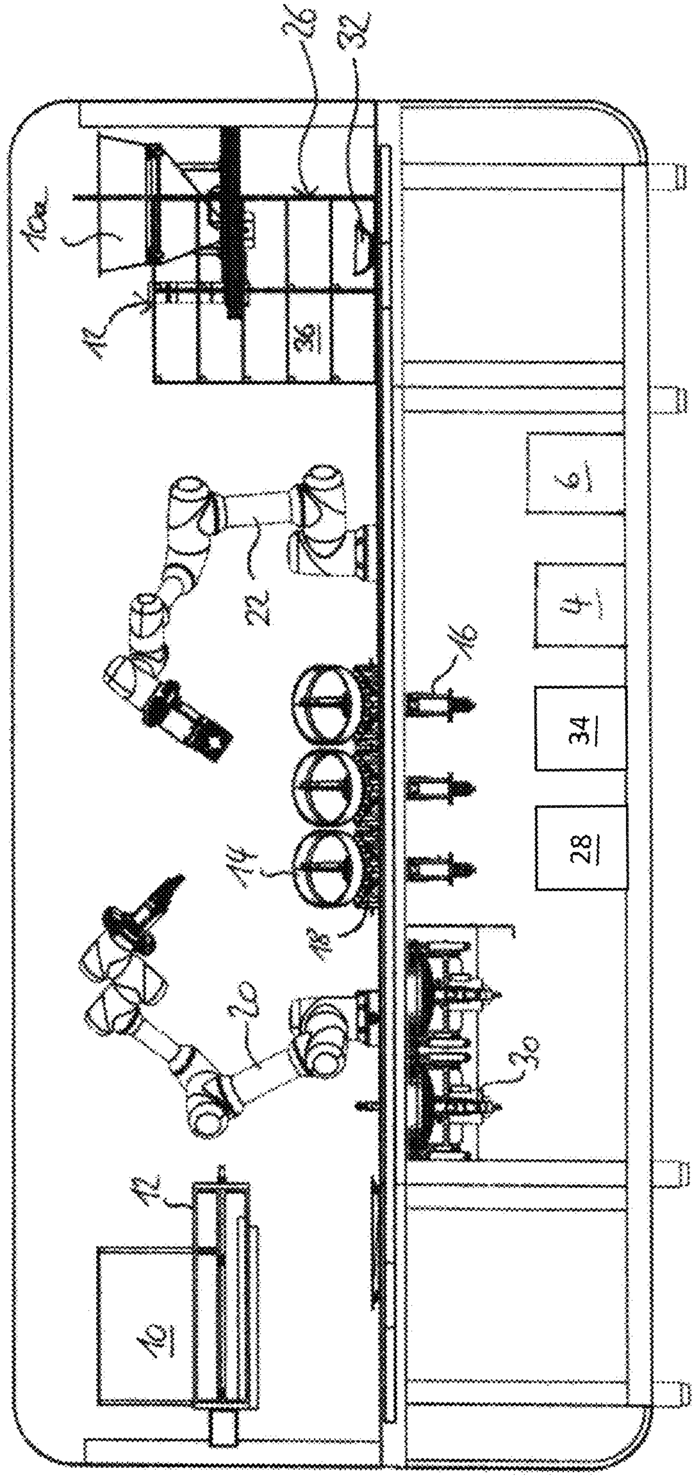
FIG. 3 another front view of the embodiment shown in FIG. 1 with the wall open.
Figure 4:
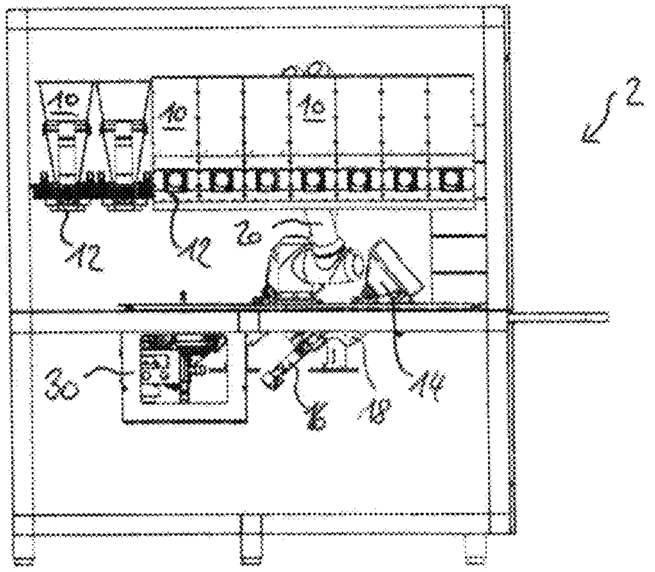
FIG. 4 a side view of the embodiment shown in FIG. 1 with the wall open.
Figure 5:
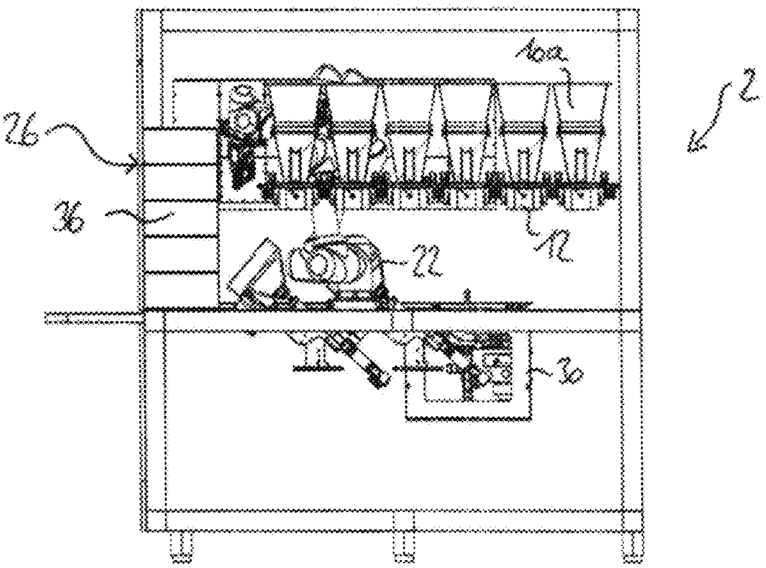
FIG. 5 another side view of the embodiment shown in FIG. 1 with the wall open.
Figure 6:
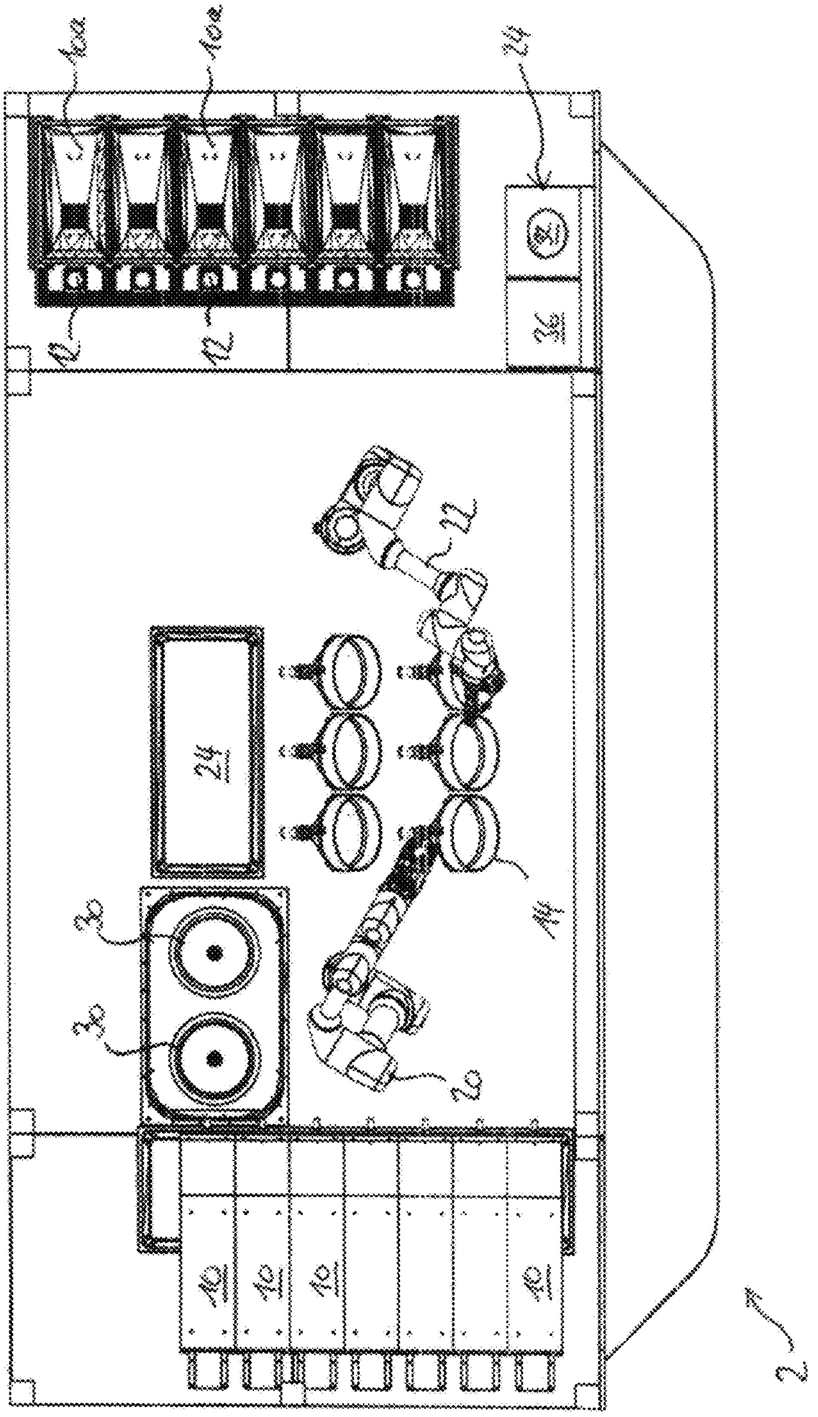
FIG. 6 a top view of the embodiment shown in FIG. 1 with the wall open.
Figure 7:
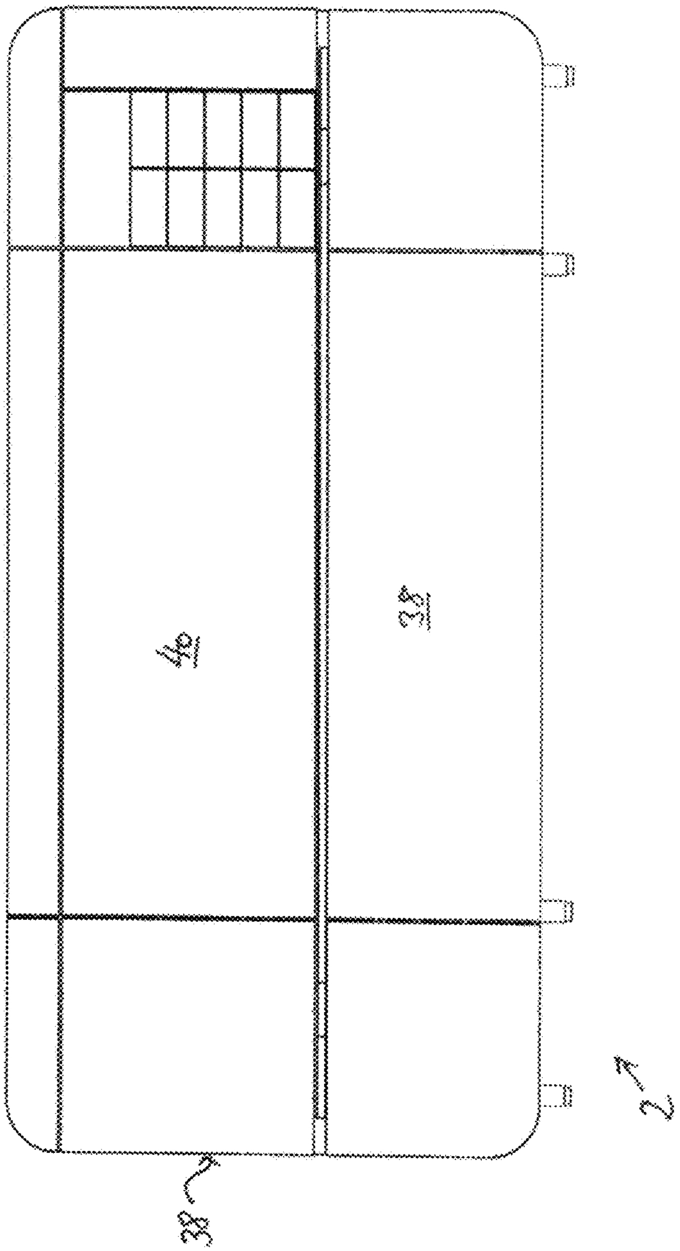
FIG. 7 a front view of an embodiment without technical elements.
Figure 8:
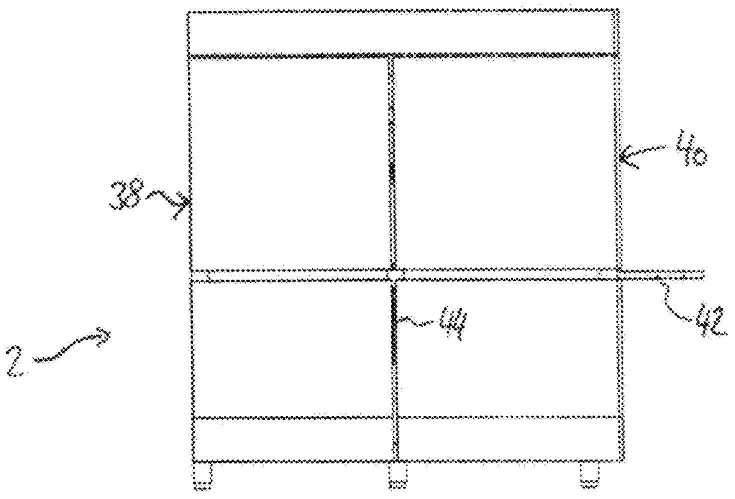
FIG. 8 a side view of the embodiment shown in FIG. 7.
Figure 9:
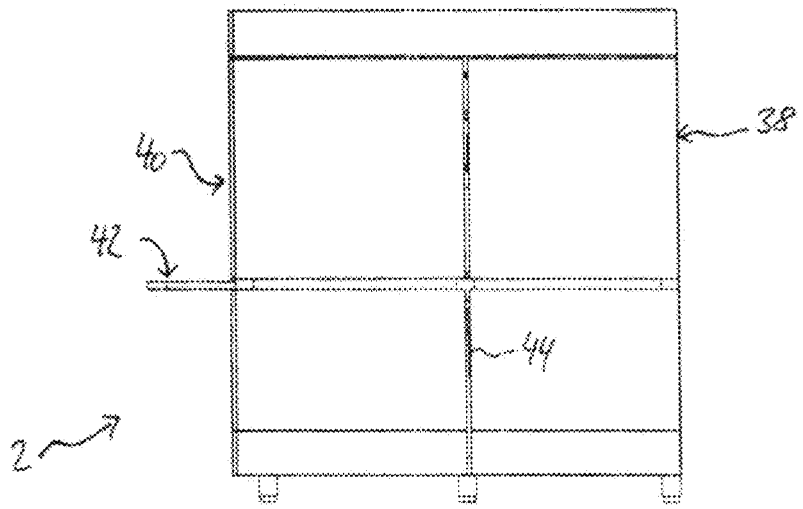
FIG. 9 another side view of the embodiment shown in FIG. 7.
Figure 10:
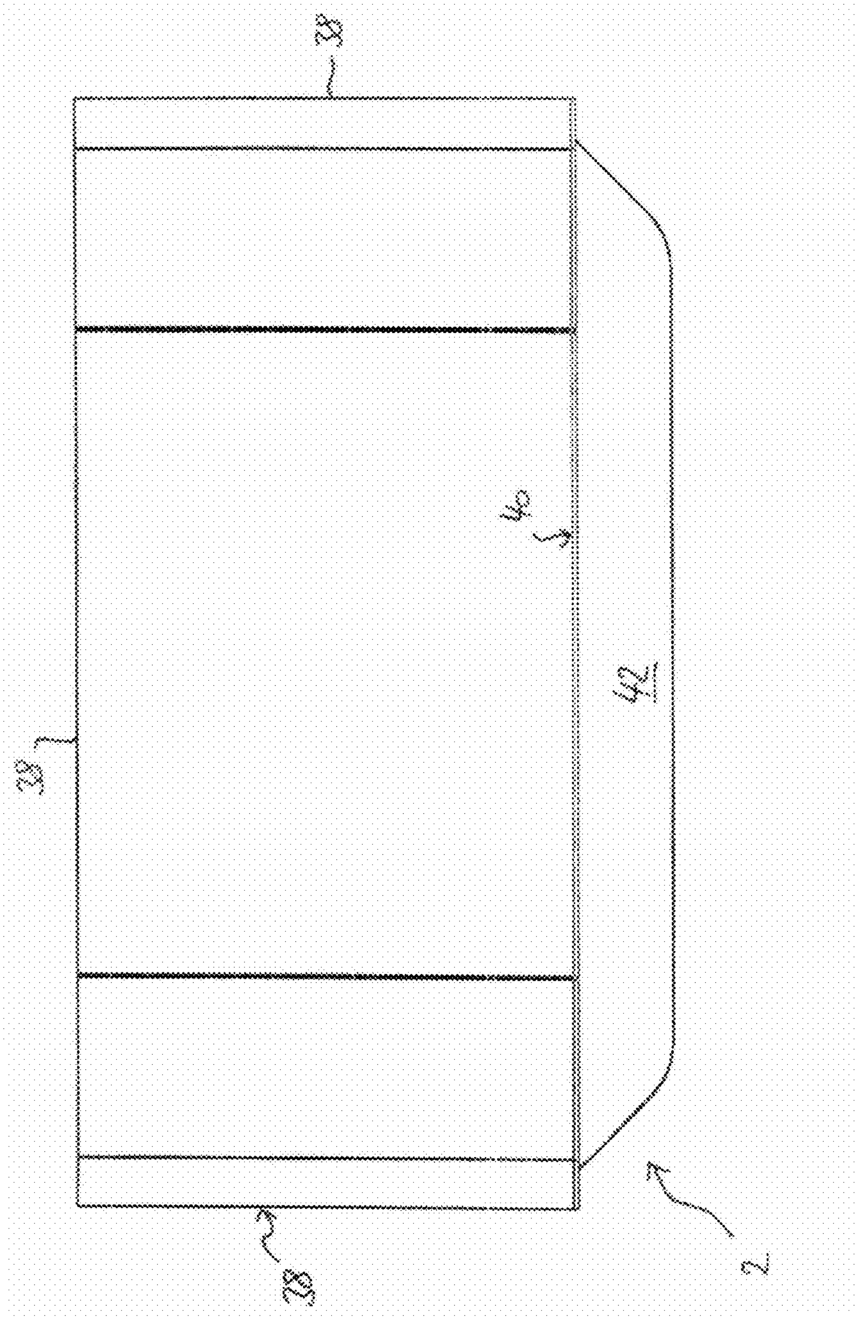
FIG. 10 a top view of the embodiment shown in FIG. 1.

FIGS. 1 to 6 show various perspectives of a preferred embodiment of the apparatus for the automated preparation of foodstuffs, whereby in part the wall enclosing the device is not shown.

The apparatus 2 shown in FIGS. 1 to 6 for automated food preparation has the following elements: at least one control device 4, at least one communication device 6, at least one storage container 10, at least one dispensing device 12, at least one preparation vessel 14, at least one mixing device 16, at least one heating device 18, a first manipulator 20, a second manipulator 22, at least one transfer station 24, at least one dispensing station 26, at least one temperature control device 28, at least one hygiene device 30.

As shown in FIGS. 1 through 6, the apparatus 2 may suitably include a plurality of storage containers 10. An associated foodstuff is stored in each of the storage containers. It will be understood that the storage containers may be shaped differently depending on the consistency, shape, size and other characteristics of the foodstuff and may have a different internal volume depending on the need for that foodstuff.

According to the number of storage containers 10, the apparatus 2 can have a plurality of dispensing devices 12. In particular, exactly one dispensing device 12 is associated with each storage container 10. The dispensing devices 12 are adapted to convey a food product from one of the storage containers 10 into the preparation vessel 14 or the serving vessel 32.

Storage containers 10 may be provided which store a foodstuff which is later prepared or heated or cooked or fried or roasted in the preparation vessel 14. Different therefrom, storage containers may be provided which contain foodstuff intended to be placed in the serving vessel 32 after the food has been prepared.

Since the foodstuffs may have different consistencies, for example may be in liquid, solid, pasty, powdery, dry, ground, granular, granular or lumpy form or mixtures, the storage containers 10, 10*a* may be formed differently. Storage containers 10, 10*a* may, for example, be formed of, in particular, dimensionally stable or collapsible or compressible plastics, glass or metal, in particular corrosion-free steel. Furthermore, the storage containers 10, 10*a* can be designed as reusable containers, in particular cleanable or rinsable, or can be designed as disposable containers.

Dispensing means 12 are adapted to convey food stored in the associated storage container 10, 10*a*. Dispensing means 12 are therefore adapted to the contents of the associated storage container 10, 10*a*. Preferably, dispensing means 12 may comprise a peristaltic pump, for example for ketchup, or a screw conveyor, for example for rice or pasta, or a paddle wheel conveyor, for example for nuts, or a pneumatic conveyor, for example for powdered sugar, or a suction conveyor, for example for chocolate chips, or a vibratory conveyor, for example for chopped pistachios.

The preparation vessel 14, into which the foodstuffs are filled from the storage containers, is designed to be heat-resistant, since the foodstuffs are generally heated. Since heating is preferably performed by an induction heat source 18 as the preferred heating device 18, but may alternatively be performed by a gas flame or an electric resistance heater, the preparation vessel 14 is suitably formed of a metal.

In the preferred embodiment shown, the preparation vessel 14 has a substantially conical or funnel-shaped shape. The axis of rotation forms a preferred direction. The foodstuffs can be introduced into the preparation vessel 14 along a filling direction E which is oriented parallel to the axis of rotation.

Likewise, a handling element may extend substantially along the axis of rotation, with which the preparation vessel 14 may be handled. The handling may include at least regionally receiving the handling element in a complementary handling element of the mixing device 16, that is, coupling the preparation vessel 14 and the mixing device. The handling may also comprise gripping the handling element by an end effector of the first manipulator 20. The handling and coupling may also be performed separately, and the handling element of the preparation vessel may only serve to position it by the first manipulator.

By at least regionally receiving the preparation vessel 14 or its handling element in the mixing device 16, preparation vessel 14 can be moved, in particular in order to stir, shake and/or mix the foodstuffs contained therein by forcing or rotation in such a way that a substantially homogeneous mass or mixture is produced.

The preferred embodiment shown features an articulated arm robot, which serves as the first manipulator 20. It is understood that other types of robots may also be used, such as SCARA or Delta robots.

The first manipulator 20 has an end effector at the distal end member that can grip the preparation vessel 14 at the handling element. In particular, the first manipulator 20 may be designed to be disinfectable or food safe, for example, made of a non-corrosive metal or a chemically inert material, for example, stainless steel or a chemically resistant plastic.

In a method for preparing food carried out with the apparatus, the first manipulator 20 has the task of gripping a preparation vessel 14 and positioning this in succession to at least two selected dispensing devices 12 according to a recipe in such a way that the dispensing devices 12 can fill the necessary food into the preparation vessel 14 according to the recipe. The individual movements necessary for this are controlled or regulated by a manipulator control 34. The movement sequences associated with a recipe may also be stored in the manipulator control 34, or may be transmitted to the manipulator control 34 from another control as required.

After the foodstuff has been filled into the preparation vessel 14, it is moved to the mixing device 16 and/or heating device 18 by the first manipulator 20 and deposited there. The mixing device 16 and/or heating device 18 can receive the preparation vessel with a complementary holding device for this purpose. The time during which the foodstuffs are mixed and/or heated in the preparation vessel 14 may be about 1 minute to about 5 minutes, preferably about 3 minutes. In the meantime, the first manipulator may handle another preparation vessel 14. Therefore, the apparatus 2 preferably includes a plurality of preparation vessels and mixing devices 16 and/or heating devices 18. Preferably, 2 to 10, more preferably 4 to 8, in particular 6 preparation vessels 14 may be provided for simultaneous use.

After mixing and/or heating the food, in a further step of the method, the preparation vessel may be moved by means of the first manipulator 20 to a transfer station 24 to transfer the contents of the preparation vessel 14 to the serving vessel 32. The transfer may in particular be located in an area of the transfer station 24 which is both in the working area of the first manipulator 20 and in a working area of the second manipulator 22 which is adapted to handle the serving vessel 32.

In a further step of the method, the second manipulator 22 can grip the serving vessel 32 and position it successively on at least one selected dispensing device 12 in accordance with the recipe in such a way that the dispensing device 12 can fill the necessary food, for example a topping, into the serving vessel 32 in accordance with the recipe. The individual movements necessary for this are controlled or regulated by the manipulator control 34 or a further manipulator control. The movement sequences of the second manipulator 22 associated with the recipe may also be stored in the manipulator control 34 or the further manipulator control, or may be transmitted to the manipulator control 34 or the further manipulator control by another control as required.

The apparatus 2 shown in FIGS. 1 to 6 further comprises a dispensing station 26, in which the serving vessel 32 is relocated in a further step to be made available for dispensing to the user. The dispensing station 26 may include a plurality of dispensing compartments 36, such that advantageously a plurality of prepared meals may be provided for pick-up by a plurality of users simultaneously. Advantageously, each dispensing compartment 36 is configured such that only one dish can be provided into the dispensing compartment 36 by the second manipulator 22 or the dispensing compartment 36 can be opened in the direction of the user for removal of the food. Advantageously, this prevents the user from reaching through into the device 2.

While serving vessels 32 are discharged from the apparatus 2 as disposable or reusable tableware, the preparation vessel 14 remains in the apparatus 2 for further use. For this purpose, the preparation vessel 14 must first be cleaned in a further step. For this purpose, at least one hygiene device 30 is provided, which is designed as a rinsing device. This is designed to rinse the at least one preparation vessel 14 with cold and/or hot water after use. In particular, the water can be sprayed into the preparation vessel 14 with pressure in order to remove the food residues present there. Alternatively or additionally, a cleaning brush may be provided which mechanically cleans the preparation vessel 14. Particularly preferably, the preparation vessel 14 can finally be dried with warm or hot air in order to be immediately ready for use again.

FIGS. 7 to 10 show various views of an embodiment. The apparatus 2 is at least partially enclosed or limited by a wall 38. A window 40 may be provided to allow a user to see into the apparatus 2 so that the user can follow the process of preparation. Preferably, a counter 42 may be provided on which the user can place things.

The dimensions of the apparatus 2 defined by the wall 38 are preferably smaller than those of a 20-foot standard container, so that transport is possible in a simple manner. Further preferably, the apparatus 2 can be disassembled into modules for transport or installation at the place of operation. For this purpose, separation points 44 can be provided at which the wall 38 or the apparatus 2 can be separated and reassembled.

Figure 11:
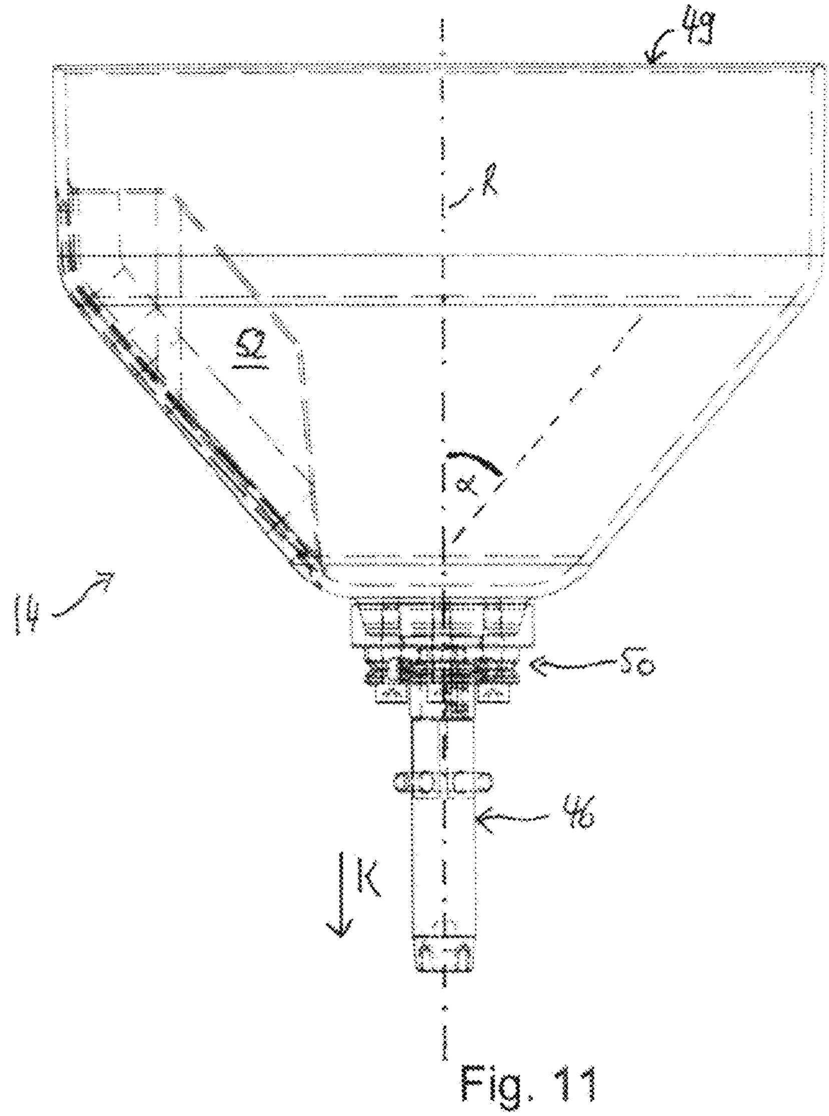
FIG. 11 a view of a preparation vessel according to the invention.

FIG. 11 shows a view of a preparation vessel 14 according to the invention. The preparation vessel 14 can have a coupling element 46 which extends substantially along the axis of rotation R, in particular in alignment therewith. The coupling element 46 is configured to cooperate with a complementary coupling element 48 of the mixing device (shown in FIG. 12), so that the preparation vessel 14 is received in the mixing device 16 and can be caused to rotate about the axis of rotation R of the preparation vessel 14. Particularly preferably, the coupling element 46 could also serve as a handling element that can be gripped by an end effector of the first manipulator. However, in the embodiment shown, the handling element 50 and the coupling element 46 are different. Advantageously, this allows simultaneous handling of the preparation vessel 14 by the first manipulator and coupling of the preparation vessel 14 to the mixing device 16. This makes it possible in a simple manner for the first manipulator to couple the preparation vessel to the mixing device 16 and, in particular, for the first manipulator not to be released from the handling device 50 of the preparation vessel 14 until it has been coupled to the mixing device 16.

As shown in FIG. 11, the preparation vessel may be conical or funnel-shaped, the conical wall of the preparation vessel 14 forming an angle $\alpha$ with the axis of rotation which may preferably be about 30 degrees to about 60 degrees. The inner wall of the preparation vessel 14 has precisely one rib or fin or scoop 52. This rib extends in regions radially inwardly, that is, oriented toward the axis of rotation R. Rotation of the preparation vessel 14 about the axis of rotation R causes the contents of the preparation vessel 14 to be mixed by means of the rib 52. The preparation vessel has a handling element 50 which extends substantially along the axis of rotation R. Preferably, the handling element 50 is arranged at a side of the preparation vessel 14 opposite to a filling opening 49, so that a first manipulator (not shown in FIG. 11) with an end effector can grip the handling element 50 without allowing particles or fluids from the end effector to enter the filling opening 49 and thus the dish. The coupling element 46 is configured to couple with a complementary coupling element of a mixing device, such that the mixing device can apply torque to the coupling element 46 to cause the preparation vessel to rotate and rotate axis R. The coupling element may be configured to couple with the complementary coupling element by displacement along an insertion direction K. Preferably, the insertion direction K may be parallel to the axis of rotation R. As shown in the preferred embodiment shown in FIG. 11, the handling element 50 and the coupling element 46 may be different and, in particular, spaced apart from each other along the insertion direction K.

Figure 12:
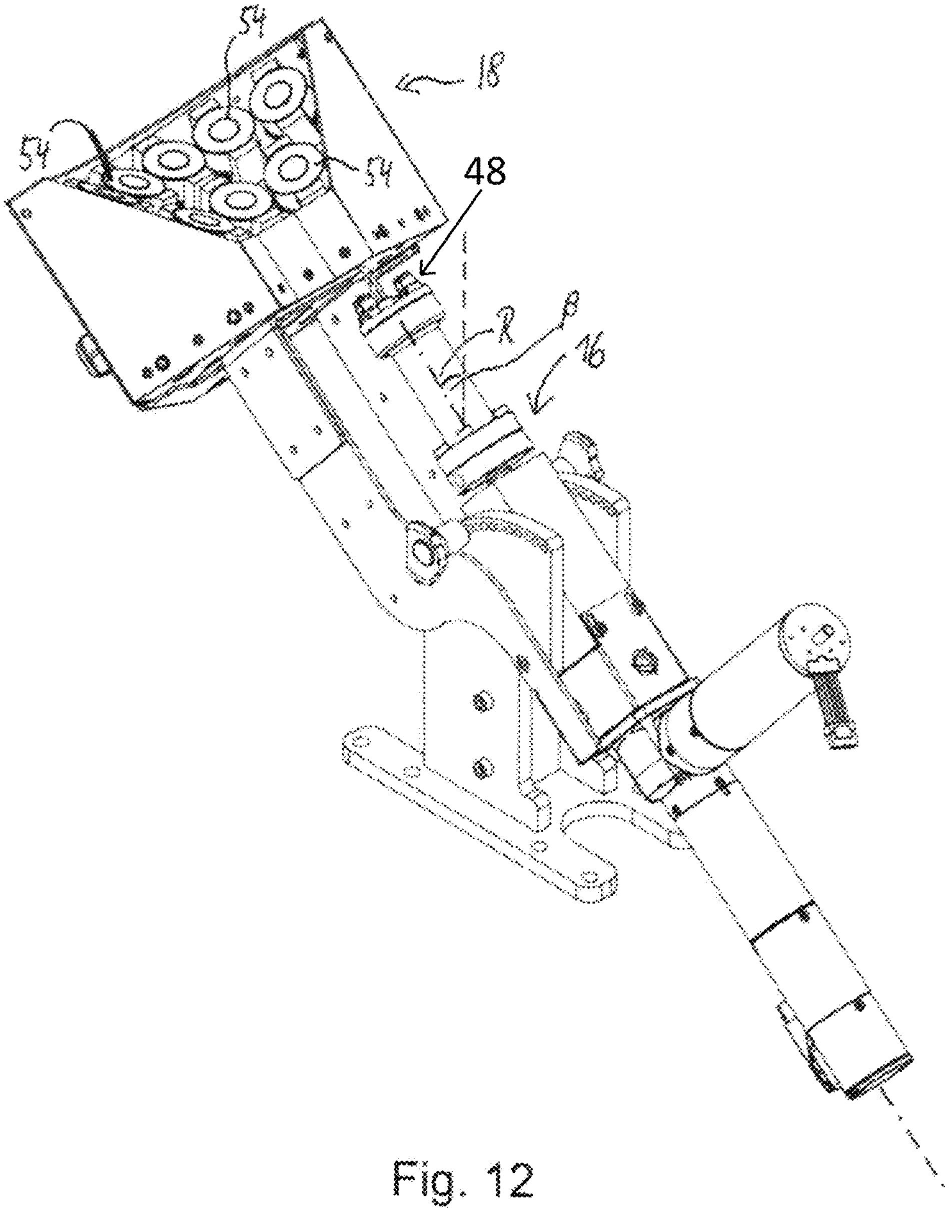
FIG. 12 a view of a heating and mixing device.

FIG. 12 shows a view of a heating device 18 with a combined mixing device 16. The mixing device 16 can cause the preparation vessel 14 to rotate about the axis of rotation R to mix the contents of the preparation vessel 14. Preferably, the axis of rotation R of the preparation vessel 14 coupled to the mixing device 16 includes an angle β of about 30 degrees to about 60 degrees with the vertical when mixing occurs. It is understood that the angle β may be variable, in particular may be variable by motor.

FIG. 12 also shows a heating device 18 which can heat the preparation vessel 14. In the preferred embodiment shown, induction coils 54 are arranged in such a way that only a small gap of less than 10 mm, preferably less than 5 mm, in particular less than 1 mm, remains between the induction coils 54 and the preparation vessel 14. The plurality of induction coils 54 can thereby be arranged in a field or array which is curved or concave, wherein in particular the radius of curvature along an orientation corresponds approximately to the radius of curvature of the preparation vessel 14 which is to be arranged in the region of the induction coils 54.

Figure 13:
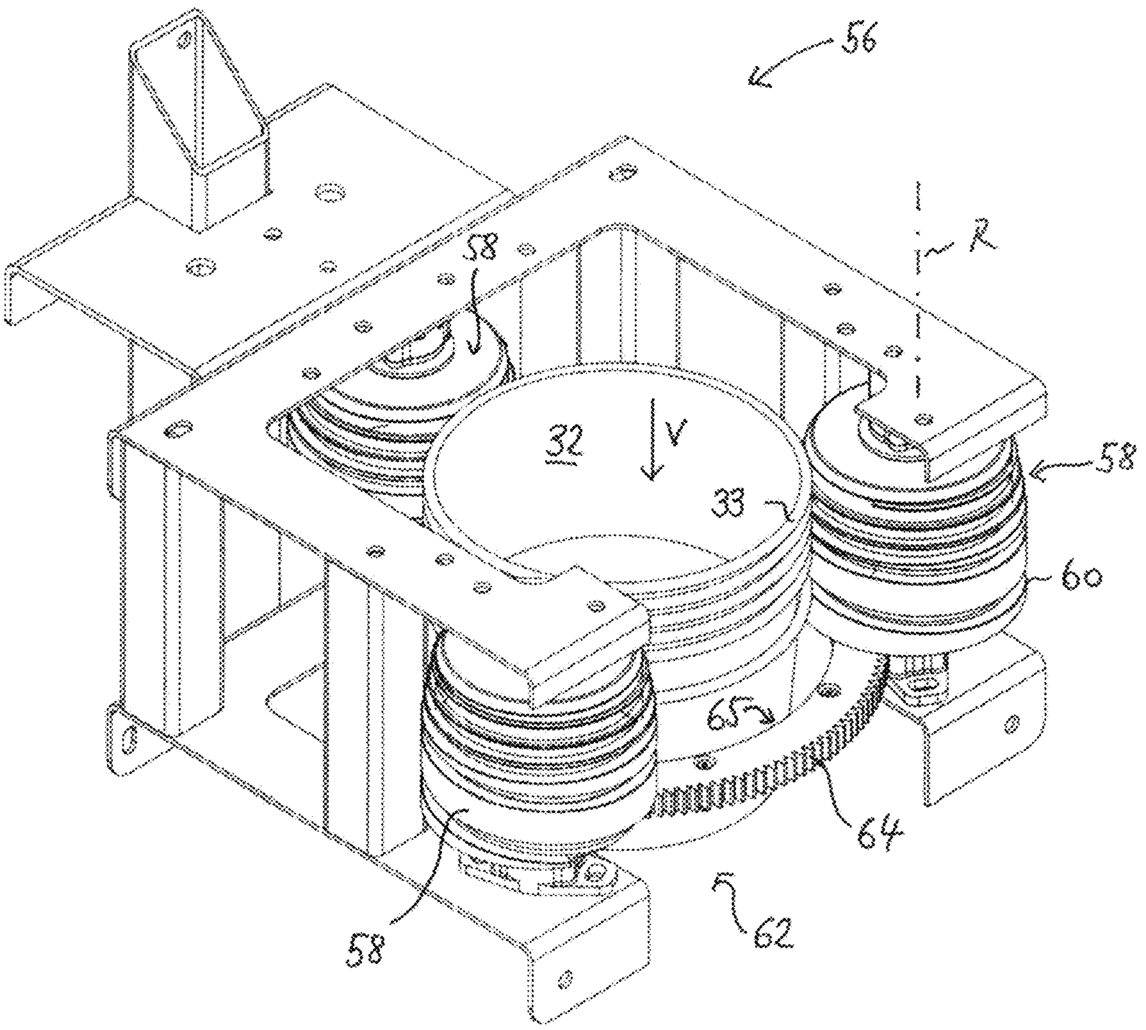
FIG. 13 a perspective view of a separating device for serving vessels.
Figure 14:
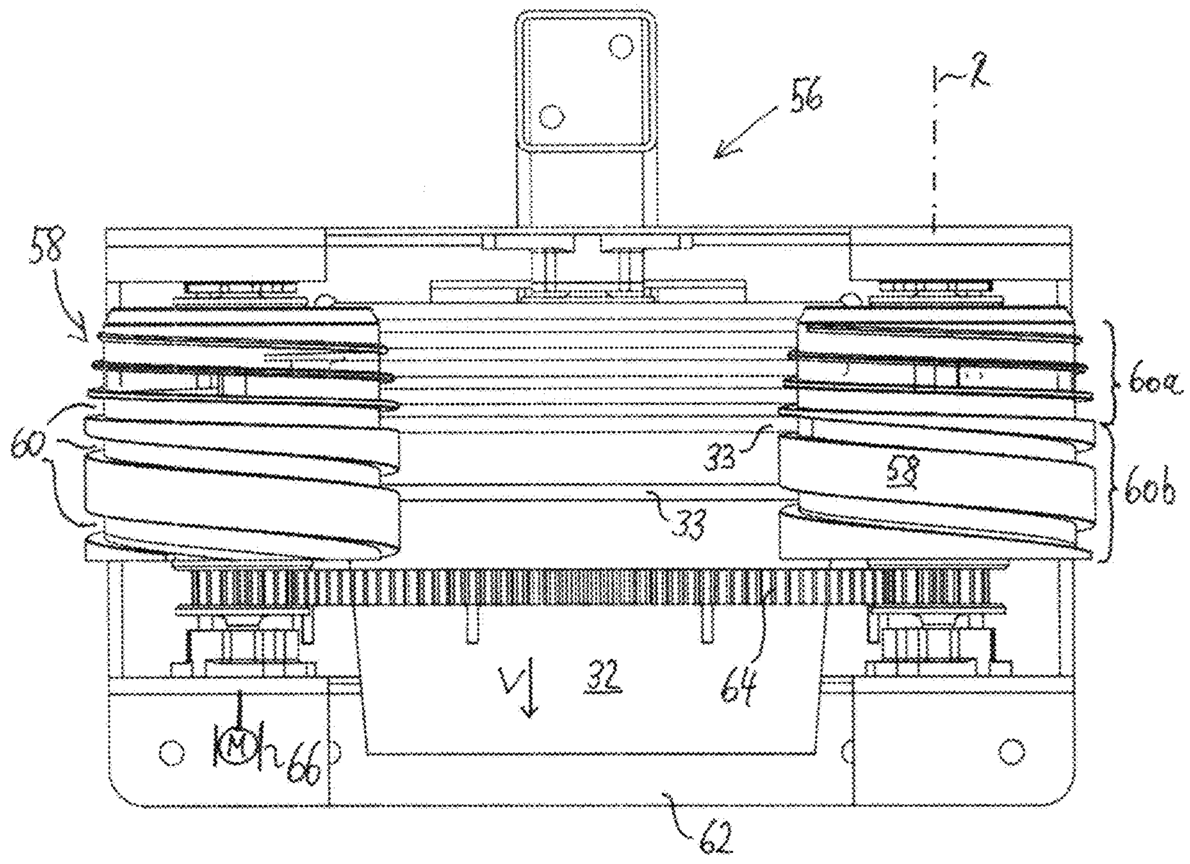
FIG. 14 a side view of the separating device from FIG. 13.

FIG. 13 shows a perspective view of a preferred embodiment of a separating device 56 for serving vessels 32, and FIG. 14 shows a side view of the separating device 56 of FIG. 13, and therefore the elements marked with the same reference signs in FIGS. 13 and 14 relate to identical elements. The separating device 56 may be considered as a separate aspect and need not necessarily, however, may preferably cooperate with other elements of the apparatus 2 for automated preparation of foodstuffs described in this application.

The handling or provision of the serving vessel by the second manipulator can in particular also include a separation of the serving vessel from a stack of serving vessels. For this purpose, the second manipulator may remove a serving vessel from a separating device. The singulation device 56 is configured to hold a stack of serving vessels 32. Holding may be accomplished by a plurality of actuators 58, particularly three or four, by frictional engagement and/or positive engagement. Each of the actuators 58 may be rotatably mounted about an axis of rotation R. The actuators 58 may be substantially cylindrical in shape, and a groove 60 may be formed in the cylinder jacket, which groove 60 is particularly adapted to engage a bulging or thickened rim 33 of the serving vessel.

The groove 60 may form a screw channel or a thread. In other words, the groove 60 has a pitch or is oriented relative to the axis of rotation R at an angle different from 90 degrees. As a result of the rim 33 of the serving vessel 32 engaging the groove 60, the rim 33 can be guided by the groove 60 during rotation of the actuator 58 about the axis of rotation R, and thus the serving vessel 32 can be guided or displaced as a function of the pitch of the groove or screw channel or thread and the speed of rotation. The displacement may be along a displacement direction V parallel to the axis of rotation R towards a discharge opening 62.

As shown in FIG. 14, the pitch of the groove 60 of the actuator does not have to be constant, but can rather be designed in such a way that the pitch of the groove 60 steadily increases towards the dispensing opening 62. This advantageously achieves that at the beginning of the separating step a higher force can be applied to detach the lowest serving vessel from the stack of serving vessels and the displacement speed towards the dispensing opening 62 increases, provided that the rotation speed remains constant. Further, as shown in FIG. 14, a rim 33 of an associated serving vessel may be disposed or engaged in each turn of the groove 60 or screw thread. Separation is effected by a rotation of the actuator 58 whereby in the upper part, where the serving vessel 32 is still connected to the stack, in particular by static friction, there is less vertical displacement than in the lower part, which is closer to the dispensing opening 62, where the serving vessel 32 is already disengaged from the stack. In other words, when the actuator 58 is rotated uniformly, the rate of displacement increases from top to bottom, while the force transmitted to the edge of the serving vessel 32 decreases from top to bottom. This is advantageous because when the serving vessel 32 is separated along gravity, the force to be applied decreases from the top (to overcome static friction) to the bottom (after release). Since, as shown in FIG. 14, a portion of the stack of serving receptacles 32 is in a nested state and only the lowermost serving receptacle 32 is to be released from the stack, an actuator 58 preferably includes a first region 60*a* in which the pitch of the groove 60 is constant and a second region 60*b* in which the pitch of the groove 60 is different from the pitch in the first region 60*a*, the pitch of the groove 60 preferably increasing or being non-constant in the second region 60*b*.

For synchronous rotation or rotation of two or more actuators 58, a (toothed) belt, chain or sprocket 64 may be provided, which mechanically connects the actuators 58 to each other and optionally to a drive 66. In particular, an actuator 58 may be directly connected to the drive 66. Advantageously, synchronous actuation of the actuators 58 can be achieved with only a single drive. In the event that a sprocket 64 (as shown in FIGS. 13 and 14) is provided, the sprocket 64 may include a central opening 65 through which the serving vessels 32 may be displaced along the displacement direction V.

LIST OF REFERENCE SIGNS

2 Apparatus
4 Control device
6 Communication device
10 Storage container
12 Dispensing device
14 Preparation vessel
16 Mixing device
18 Heating device
20 first manipulator
22 second manipulator
24 Transfer station
26 Output station
30 Hygiene device
32 Serving vessel 33 Rim of the serving vessel 32
34 Manipulator control
36 Output tray
38 Wall
40 Window
42 Counter
44 Separation points
46 Coupling element
48 Complementary coupling element
49 Filling opening
50 Handling element
52 Rib
54 Induction coils
56 Separating device
58 Actuator
60 Groove
62 Dispensing opening
64 Sprocket
65 Center opening of the sprocket 64
66 Drive
K Insertion direction
R Rotation axis
V Direction of displacement

The invention claimed is:

1. An apparatus for automated food preparation, the apparatus comprising:

at least one preparation vessel which is rotationally symmetrical about an axis of rotation and is configured to receive at least one foodstuff;

at least one mixing device configured to mix contents of the at least one preparation vessel; and at least one first robotic manipulator configured to handle the at least one preparation vessel, wherein the at least one preparation vessel comprises a coupling element extending along the axis of rotation, the coupling element is configured to cooperate with a complementary coupling element of the at least one mixing device so that the at least one preparation vessel is received in the at least one mixing device and is set in rotation about the axis of rotation of the at least one preparation vessel, and the at least one first robotic manipulator comprises an end effector at a distal end member, the end effector configured to grip the at least one preparation vessel.

2. The apparatus according to claim 1, wherein an inner wall of the at least one preparation vessel has exactly one, two or more rib(s) or fin(s) or scoop channel(s), which extend(s) radially inwards in regions.

3. The apparatus according to claim 1, wherein at least one preparation vessel comprises:

a handling element different from the coupling element, wherein the handling element is configured to be gripped by the end effector of the at least one first robotic manipulator.

4. The apparatus according to claim 3, wherein the end effector is configured to come into frictional and/or positive engagement with the handling element.

5. The apparatus according to claim 1, wherein the apparatus comprises at least one heating device configured to heat the contents of the at least one preparation vessel.

6. The apparatus according to claim 5, wherein the at least one heating device includes induction coils; and the at least one heating device is configured to heat the at least one preparation vessel using the induction coils.

7. The apparatus according to claim 6, wherein the induction coils of the at least one heating device are wound circularly or elongatedly; and geometry of the induction coils corresponds to a wall shape of the at least one preparation vessel.

8. The apparatus according to claim 5, further comprising:

at least one heating device controller configured to control or regulate the at least one heating device.

9. The apparatus according to claim 1, further comprising:

at least one transfer station in which the contents of the at least one preparation vessel are transferred to at least one serving vessel.

10. The apparatus according to claim 9, further comprising:

at least one robotic manipulator configured to handle the at least one serving vessel.

11. The apparatus according to claim 10, wherein the at least one robotic manipulator configured to handle the at least one serving vessel is at least one second robotic manipulator different from the at least one first robotic manipulator.

12. The apparatus according to claim 9, further comprising:

at least one dispensing station configured to dispense the at least one serving vessel.

13. The apparatus according to claim 1, further comprising:

at least one temperature control device configured to keep at least parts of an interior of the apparatus at a predetermined temperature.

14. The apparatus according to claim 1, further comprising:

at least one hygiene device configured to cleans at least parts of an interior of the apparatus.

15. The apparatus according to claim 1, further comprising:

at least one robotic manipulator control device configured to controls at least one component of the apparatus in order to carry out the preparation.

16. The apparatus according to claim 15, wherein the at least one robotic manipulator control device is further configured to:

communicate with a user or a higher-level controller.

17. The apparatus according to claim 1, further comprising:

at least one storage container configured to store a food product.

18. The apparatus according to claim 17, further comprising:

at least one dispensing device configured to dispense foodstuff from the at least one storage container.

19. The apparatus according to claim 1, further comprising:

at least one sensor connected to an associated heating device controller, the at least one sensor configured to measure a temperature of an associated preparation vessel so that an associated heating device is controlled.

20. A method of automatically preparing food using an apparatus, the method comprising:

gripping a handling element of a preparation vessel by an end effector of a first robotic manipulator;

positioning the preparation vessel using the first robotic manipulator according to a selected recipe successively at at least two dispensing devices, the at least two dispensing devices filling necessary foodstuff into the preparation vessel according to the selected recipe;

positioning the preparation vessel using the first robotic manipulator on a mixing device or a heating device, wherein a coupling element of the preparation vessel cooperates with a complementary coupling element of the mixing device so that the preparation vessel is received in the mixing device and is set in rotation about an axis of rotation of the preparation vessel; and mixing contents of the preparation vessel using the mixing device and/or heating the contents of the preparation vessel using the heating device according to the selected recipe.

21. The method according to claim 20, comprising at least one of:

transferring the preparation vessel to a transfer station using the first robotic manipulator;

providing a serving vessel by separating the serving vessel from a stack of serving vessels;

transferring the contents of the preparation vessel into the serving vessel, wherein during the providing and/or the transferring a second robotic manipulator handles the serving vessel;

positioning the serving vessel using the second robotic manipulator in accordance with the selected recipe sequentially on at least one selected dispensing device;

filling of at least one food product using the at least one selected dispensing device;

removing the serving vessel to or into a dispensing station to be made available for dispensing to a user;

identifying the user and releasing a serving station in which a dish assigned to the user is located in the serving vessel;

cleaning the preparation vessel for further use;

receiving an order to prepare a meal by a robotic manipulator control device;

selecting the recipe assigned to the dish by the robotic manipulator control device; and selecting the preparation vessel assigned to the dish by the robotic manipulator control device.

* * * * *